(12) United States Patent
Kurtz et al.

(10) Patent No.: US 10,508,607 B2
(45) Date of Patent: Dec. 17, 2019

(54) DIESEL ENGINE PARTICULATE FILTER REGENERATION SYSTEM AND METHODS

(71) Applicant: Ford Global Technologies, LLC, Dearborn, MI (US)

(72) Inventors: Eric Matthew Kurtz, Dearborn, MI (US); Eric James Kastanis, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 15/708,869

(22) Filed: Sep. 19, 2017

(65) Prior Publication Data

US 2019/0085778 A1  Mar. 21, 2019

(51) Int. Cl.

| | |
|---|---|
| *F02D 41/02* | (2006.01) |
| *F02M 26/04* | (2016.01) |
| *F01N 3/025* | (2006.01) |
| *F01N 9/00* | (2006.01) |
| *F01N 11/00* | (2006.01) |
| *F02B 75/28* | (2006.01) |
| *F02D 41/40* | (2006.01) |
| *F02D 41/30* | (2006.01) |
| *F01N 3/10* | (2006.01) |
| *F01N 3/021* | (2006.01) |

(52) U.S. Cl.
CPC .......... *F02D 41/029* (2013.01); *F01N 3/025* (2013.01); *F01N 9/002* (2013.01); *F01N 11/002* (2013.01); *F02B 75/282* (2013.01); *F02D 41/3094* (2013.01); *F02D 41/403* (2013.01); *F02D 41/405* (2013.01); *F02M 26/04* (2016.02); *F01N 3/021* (2013.01); *F01N 3/103* (2013.01); *F01N 2430/06* (2013.01); *F01N 2900/08* (2013.01); *F01N 2900/1406* (2013.01); *F01N 2900/1602* (2013.01); *F02D 2200/0406* (2013.01); *F02D 2200/0616* (2013.01)

(58) Field of Classification Search
CPC ........ F01N 2430/06; F02D 2200/0616; F02D 41/3094; F02D 41/403; F02D 41/405
See application file for complete search history.

(56) References Cited

U.S. PATENT DOCUMENTS

| | | | |
|---|---|---|---|
| 7,520,260 B2 | 4/2009 | Nakamura et al. | |
| 8,078,392 B2 | 12/2011 | Yahata et al. | |
| 2004/0139738 A1* | 7/2004 | Kuboshima | F01N 3/0842 |
| | | | 60/288 |

(Continued)

OTHER PUBLICATIONS

Kurtz, Eric et al., "Diesel Engine Particulate Filter Regeneration System and Methods," U.S. Appl. No. 15/702,364, filed Sep. 12, 2017, 35 pages.

*Primary Examiner* — Audrey K Bradley
*Assistant Examiner* — Anthony Ayala Delgado
(74) *Attorney, Agent, or Firm* — Geoffrey Brumbaugh; McCoy Russell LLP

(57) ABSTRACT

Methods and systems for estimating an amount of residual or retained fuel that remains in a cylinder from a first cycle of the cylinder to a second cycle of the cylinder are described. In one example, the amount of residual fuel is estimated in response to a temperature of an oxidation catalyst. The retained fuel amount may then be the basis for adjusting fuel injection amounts during the second cycle of the cylinder.

20 Claims, 4 Drawing Sheets

(56) References Cited

U.S. PATENT DOCUMENTS

| | | | |
|---|---|---|---|
| 2005/0060990 A1* | 3/2005 | Ueno | F01N 3/023 60/295 |
| 2007/0137179 A1 | 6/2007 | Kondou et al. | |
| 2011/0289916 A1* | 12/2011 | Dion | F02F 1/186 60/605.2 |

* cited by examiner

DIESEL ENGINE PARTICULATE FILTER REGENERATION SYSTEM AND METHODS

BACKGROUND/SUMMARY

A two stroke diesel engines and four stroke diesel engines that include variable valve timing may operate with relatively large amounts of residual exhaust gas that has been left in engine cylinders from earlier combustion events in the engine cylinders. These same engines may include a particulate filter in their exhaust systems to trap carbonaceous soot that may be produced as a byproduct of combustion. Over a period of time, the particulate filter may fill with soot such that it may provide a more significant restriction to exhaust gases. The particulate filter may be regenerated via increasing exhaust gas temperature and supplying an oxygen rich exhaust mixture to the particulate filter such that soot held within the particulate filter combusts, thereby regenerating the particulate filter. The exhaust gas temperature may be increased via injecting post fuel injection amounts into the cylinder that may be expelled to the engine's exhaust system where the fuel may combust within an oxidation catalyst and raise exhaust gas temperatures. However, some of the post injected fuel may be retained within engine cylinders where it may combust during a next cycle of a cylinder. The retained fuel may increase engine torque and facilitate combustion timing that is earlier than is desired. Therefore, it may be desirable to estimate an amount of fuel residual that is in an engine cylinder from one cylinder cycle to a next cylinder cycle.

The inventors herein have recognized the above-mentioned challenges and have developed an engine control method, comprising: estimating an amount of fuel held in a cylinder from a first cycle of the cylinder to a second cycle of the cylinder via a controller in response to a temperature increase of an oxidation catalyst; and adjusting an amount of fuel injected to the cylinder via the controller during the second cycle of the cylinder in response to the estimated amount of fuel.

By estimating an amount of fuel retained in a cylinder from one cylinder cycle to a next cylinder cycle in response to a catalyst temperature, it may be possible to adjust fuel injection during the next cylinder cycle in a way that provides accurate engine torque delivery and reduced emissions. The catalyst temperature may provide an accurate estimate of fuel retained in the cylinder without having to know cylinder pressure. In particular, post injected fuel that has not participated in combustion and that has been ejected from engine cylinders to facilitate particulate filter regeneration increases catalyst temperature. The catalyst temperature increase is a function of the post injected amount of fuel that has not participated in combustion within the cylinder and that has been ejected from the cylinder. The amount of post injected fuel retained in the cylinder from one cycle of the cylinder to the next cycle of the cylinder is the post injected amount of fuel minus the amount of fuel that has not participated in combustion within the cylinder and that has been ejected from the cylinder.

The present description may provide several advantages. Specifically, the approach may estimate an amount of post injected fuel that is retained in a cylinder from a cylinder cycle to a next cylinder cycle without having to know pressure within the cylinder. Further, the approach provides ways of adjusting fuel injection timing to improve engine torque control and engine emissions. In addition, the approach may help to improve control of exothermic reactions within an oxidation catalyst during particulate filter regeneration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
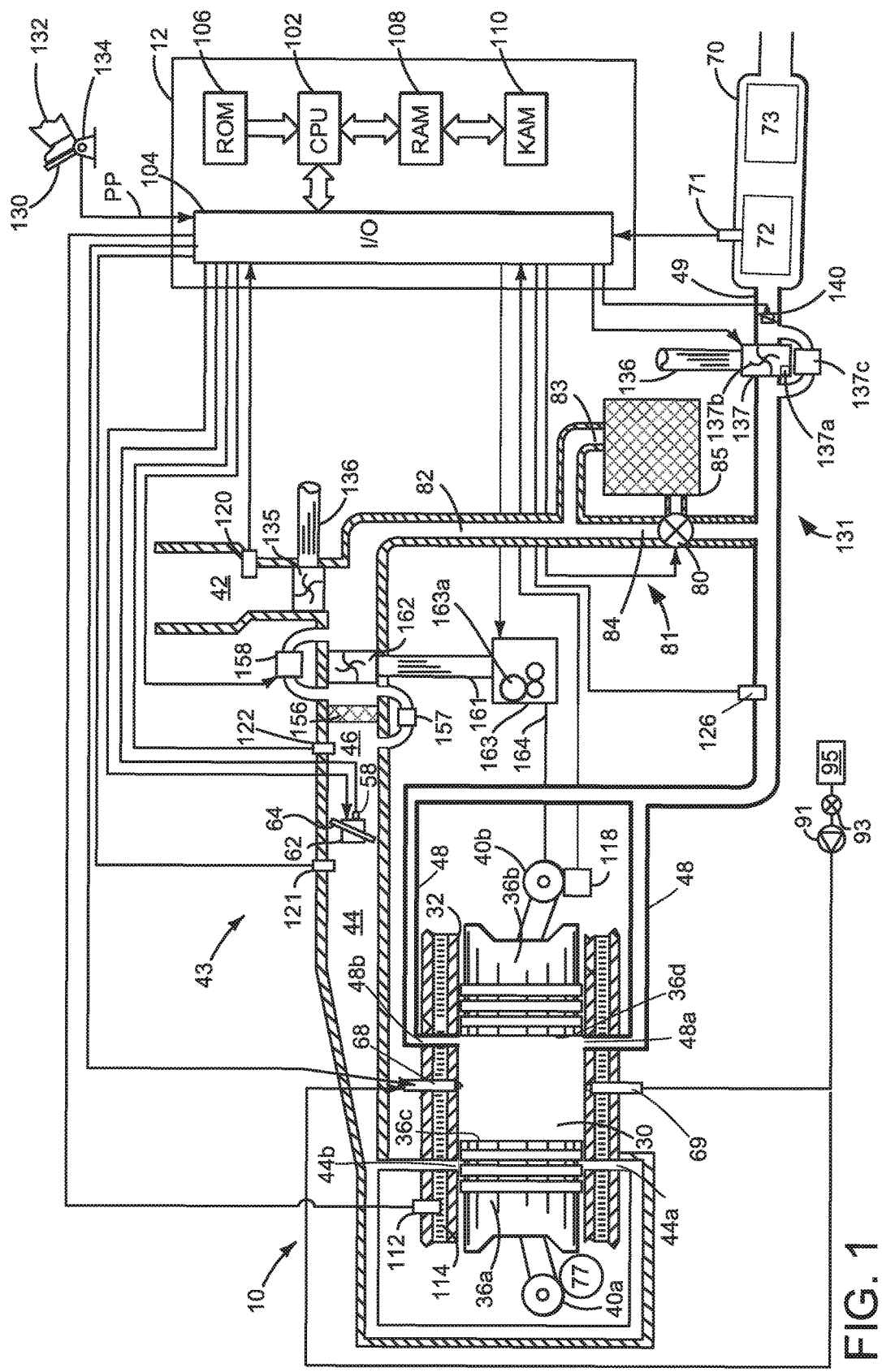
FIG. 1 shows a schematic depiction of an engine.
Figure 2:
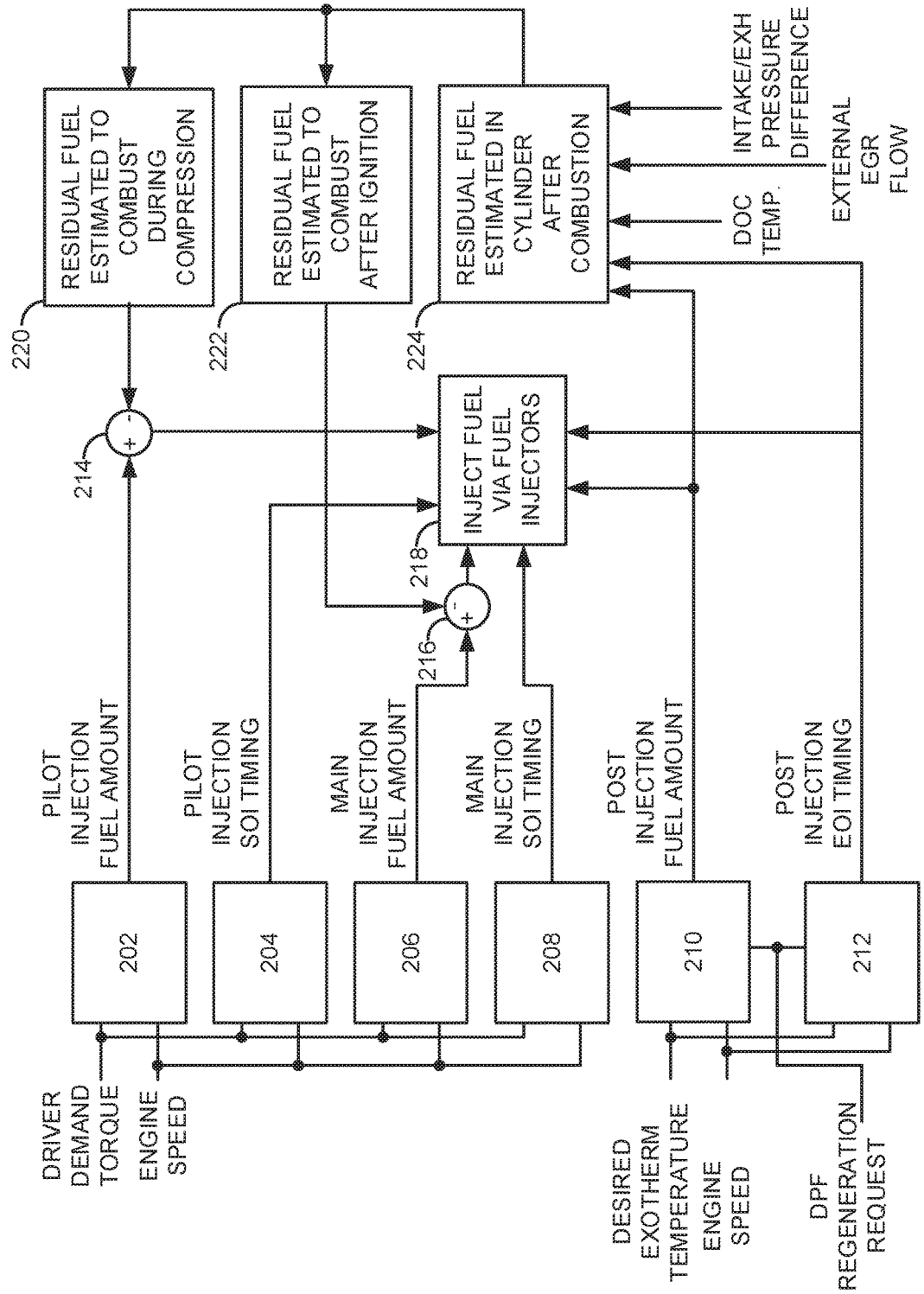
FIG. 2 shows an example particulate filter regeneration sequence.
Figure 3:
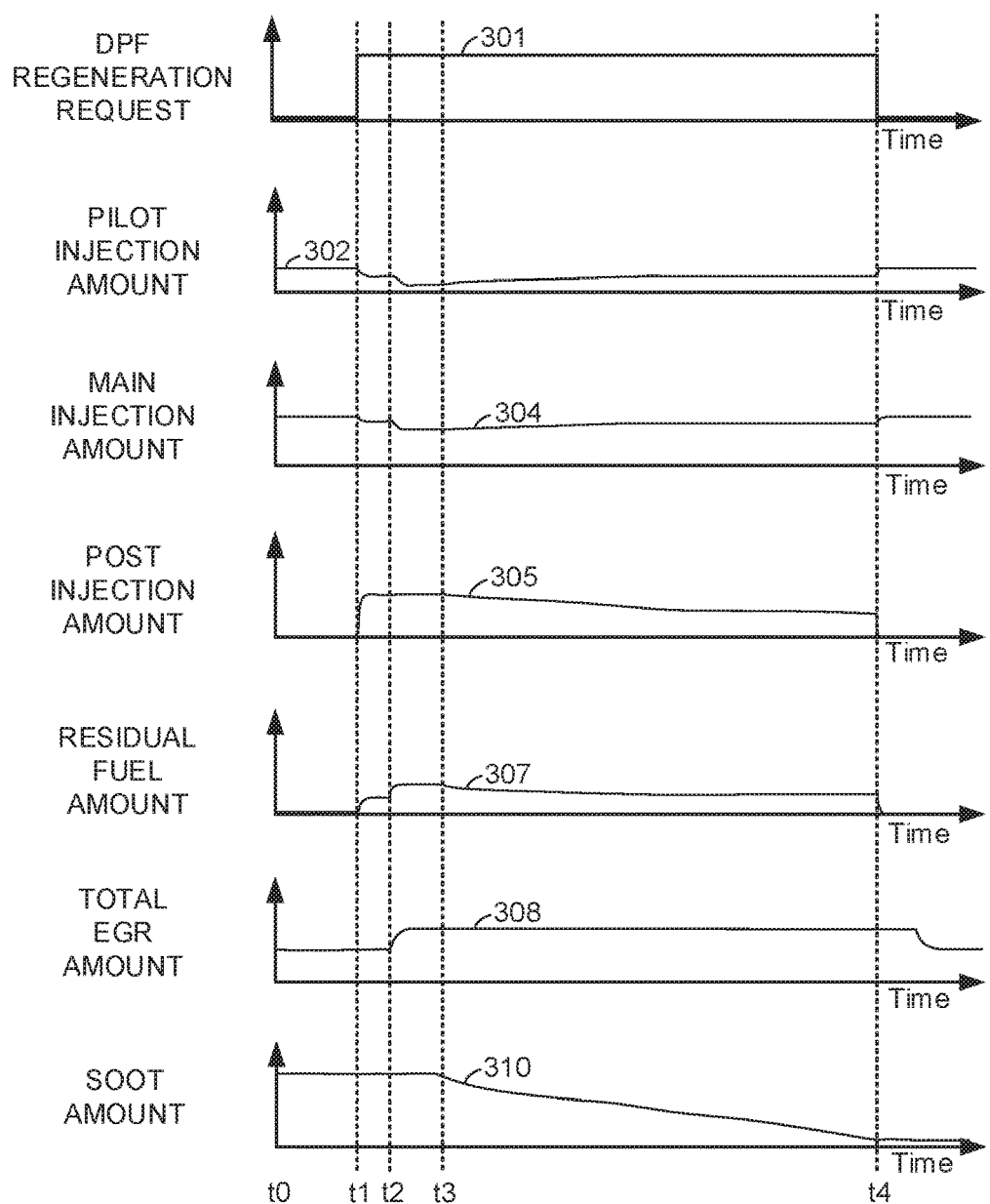
FIG. 3 shows post fuel injection timing relative to piston position.
Figure 4:
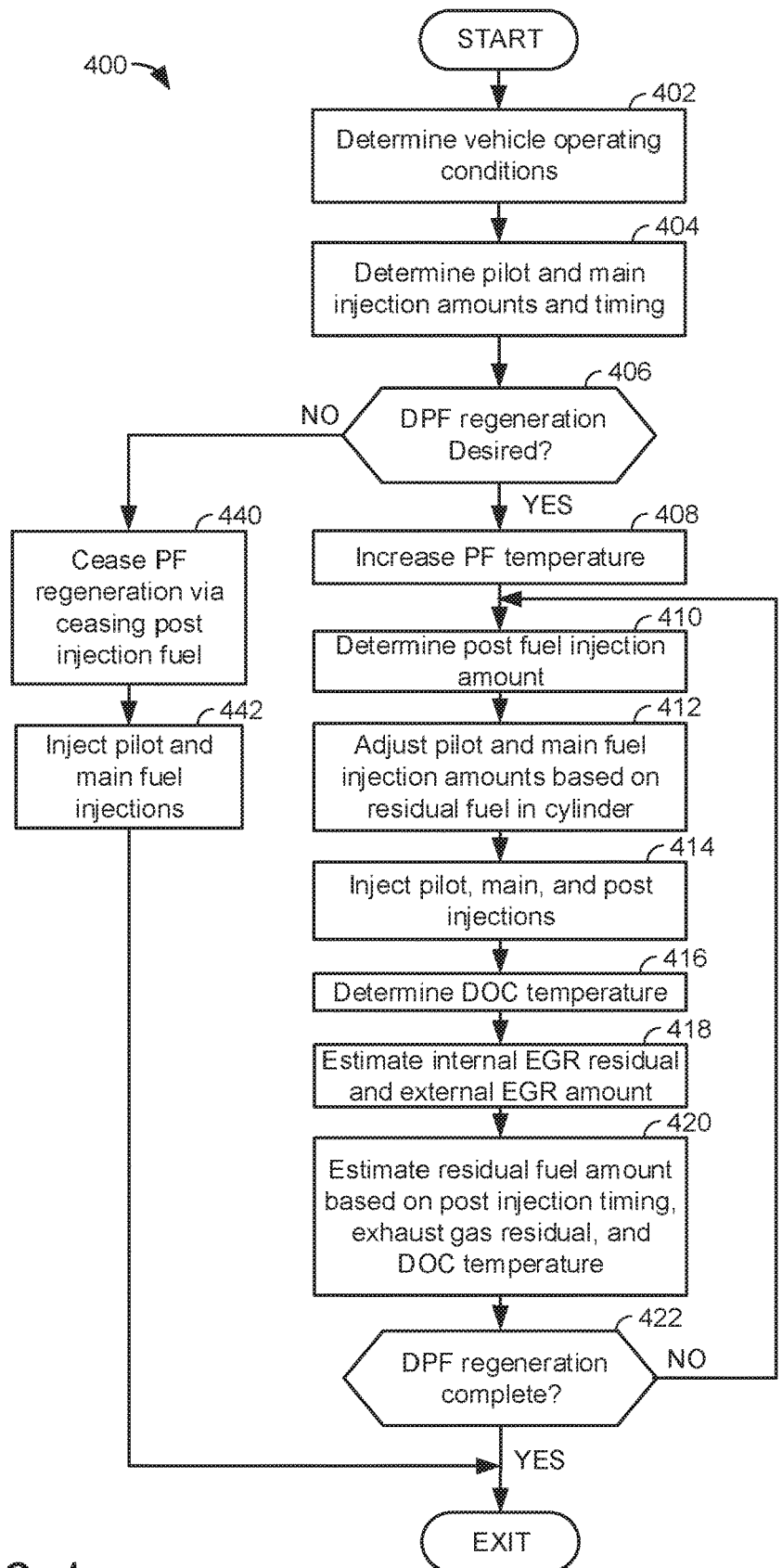
FIG. 4 is an example method for regenerating a particulate filter.

The present description is related to controlling fuel supplied to a diesel engine. FIG. 1 shows one example of a boosted two stroke diesel engine, but the method described herein is equally applicable to four stroke diesel engines. Further, the diesel engine in FIG. 1 is an opposed piston engine, but the methods described herein may also be applied to two stroke engines that include a single piston in each engine cylinder. FIG. 2 shows a block diagram of a way to adjust fuel injection. A fuel injection sequence for a diesel engine is shown in FIG. 3. A method for supplying fuel to a diesel engine is shown in FIG. 4.

Referring to FIG. 1, opposed piston internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes cylinder 30 and cylinder walls 32 with intake piston 36a and exhaust piston 36b positioned therein and connected to crankshafts 40a and 40b respectively. Crankshafts 40a and 40b may be coupled together via belts, chains or gears. Crankshafts 40a and 40b may be rotated by electric machine 77 (e.g., a starter motor) to crank engine 10. Cylinder 30 is shown communicating with intake manifold 44 and exhaust manifold 48 via intake ports 44a and 44b and exhaust ports 48a and 48b.

First fuel injector 69 and second fuel injectors 68 are shown positioned in cylinder walls 32 and they may inject fuel directly into cylinder 30, which is known to those skilled in the art as direct injection. Fuel is delivered to first fuel injector 69 and second fuel injector 68 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Supercharger compressor 162 is mechanically driven and it draws air from downstream of turbocharger compressor 135. Turbocharger compressor 135 draws air from air intake 42. Supercharger compressor 162 supplies air to boost chamber 46. Exhaust gases spin turbocharger variable geometry turbine 137 which is coupled to turbocharger compressor 135 via shaft 136. Supercharger compressor 162 is mechanically driven via crankshaft 40b via shaft 161 and gear box 163, which may be coupled to crankshaft 40b via mechanism 164 (e.g., gears, a chain, or a belt). Supercharger gear box 163 includes a plurality of gear ratios for changing speed of supercharger compressor 162 relative to speed of crankshaft 40b. Supercharger compressor speed may be adjusted via selecting and engaging gears 163a of gear box 163. In one example, a given engine crankshaft speed may rotate supercharger compressor 162 at a first speed and a second speed via switching between a first gear ratio and a second gear ratio in gear box 163.

Supercharger compressor bypass valve 158 may be selectively opened to reduce air pressure in boost chamber 46 and return air and exhaust gas recirculation (EGR) to upstream of supercharger compressor 162. In some examples, a charge air cooler 156 may be provided downstream of supercharger compressor 162 to cool the air charge entering cylinder 30. Air charge cooler bypass valve 157 may be selectively opened to bypass charge air cooler 156. A position of vane actuator 137a may be adjusted via controller 12 to increase or decrease rotational speed of turbine 137. In alternative examples, a waste gate 137b may replace or be used in addition to vane actuator 137a. Vane actuator 137a adjusts a position of variable geometry turbine vanes 137b. Exhaust gases can pass through turbine 137 supplying little energy to rotate turbine 137 when vanes are in an open position. Exhaust gases can pass through turbine 137 and impart increased force on turbine 137 when vanes are in a closed position. Alternatively, wastegate 137c or a bypass valve allows exhaust gases to flow around turbine 137 so as to reduce the amount of energy supplied to the turbine.

In an alternative example, supercharger compressor 162 may be positioned upstream of turbocharger compressor 135. Further, an air charge cooler (not shown) maybe positioned downstream of where EGR passage 82 joins intake 43 between supercharger compressor 162 and turbocharger compressor 135. The air charge cooler would obviate the need for an EGR cooler.

Exhaust gases may be recirculated to cylinder 30 via EGR system 81. EGR system includes optional EGR cooler 85, EGR valve 80, EGR passage 82, EGR cooler bypass 84, EGR sensor 89, and cooled EGR passage 83. Exhaust gases may flow from exhaust manifold 48 to the engine air intake 43 between supercharger compressor 162 and turbocharger compressor 135. EGR may flow to the engine air intake when pressure in exhaust manifold 48 is greater than pressure between turbocharger compressor 135 and supercharger compressor 162. EGR may flow through EGR cooler 85 to reduce engine exhaust gas temperatures. EGR may bypass EGR cooler 85 when engine exhaust temperatures are low. EGR sensor 89 is used to determine EGR flow through an orifice, which is converted in to an EGR amount in each engine cylinder for each engine cycle.

Fuel may be injected to cylinder 30 when pistons 36a and 36b are approaching each other after intake piston 36a covers intake ports 44a and 44b and exhaust piston 36b covers exhaust ports 48a and 48b. The fuel may then be combusted with air in cylinder 30 when piston 36 is near top-dead-center compression stroke. The fuel and air ignite via compression ignition. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

Engine 10 does not include glow plugs or spark plugs since it is a compression ignition engine and since it does not include a cylinder head. Further, engine 10 does not include poppet valves to regulate air and exhaust flow into and out of cylinder 30.

Exhaust system 131 carries exhaust away from engine 10 and processes exhaust gases. Exhaust valve 140 is shown positioned in exhaust passage 49 downstream of turbine 137a and upstream of emissions device 70. Alternatively, exhaust valve 140 may be positioned downstream of emissions device 70. Exhaust valve 140 may be opened and closed to control pressure in exhaust manifold 48. Closing exhaust valve 140 restricts flow through exhaust valve 140 and may increase pressure in exhaust manifold 48. Opening exhaust valve 140 may improve flow through exhaust valve 140 and reduce pressure in exhaust manifold 48.

Emissions device 70 can include an oxidation catalyst 72 and particulate filter 73, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF). Temperature sensor 71 senses temperature of oxidation catalyst 72.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122; exhaust gas oxygen concentration from oxygen sensor 126; an engine position sensor from a Hall effect sensor 118 sensing crankshaft 40b position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a two stroke cycle: the cycle includes a first stroke where the intake piston 36a travels toward exhaust piston 36b and exhaust piston 36b travels toward intake piston 36a. In the second stroke, intake piston 36a travels away from exhaust piston 36b and exhaust piston 36b travels away from intake piston 36a. Intake piston 36a controls flow through intake ports 44a and 44b. Exhaust piston 36b controls flow through exhaust ports 48a and 48b. In this example, exhaust piston 36b leads intake piston 36a by reaching a top dead center position (e.g., a maximum distance exhaust piston 36b is from crankshaft 40b) a few crankshaft degrees (e.g., depending on configuration, the difference may range between 0 and 20 crankshaft degrees) before intake piston 36a reaches its top dead center position (e.g., maximum distance intake piston 36a is from crankshaft 40a). Thus, exhaust piston motion is offset from intake piston motion by a few crankshaft degrees.

During the first stroke, generally, the intake piston 36a and exhaust piston 36b are moving toward each other to compress air that has entered cylinder 30. The stroke begins at bottom dead center (BDC) for intake piston 36a (intake piston 36a is closest distance to crankshaft 40a) and it ends at top dead center for intake piston 36a (intake piston 36a is at its farthest distance from crankshaft 40a). As previously mentioned, exhaust piston 36b leads intake piston 36a by a few degrees so that it is already traveling toward its TDC position when intake piston is at BDC. Further, exhaust piston 36b reaches its TDC position just before intake piston 36a reaches its TDC position. Exhaust piston 36b is located just after its TDC position when intake piston 36a reaches its TDC position. Cylinder volume is smallest when intake piston 36a and exhaust piston 36b are near their respective TDC positions. Air and fuel are compressed in cylinder 30 as intake piston 36a and exhaust piston 36b advance toward their respective TDC positions. Intake ports 44a and 44b are open and pressurized air flows into cylinder 30 when intake pistons 36a and exhaust piston 36b are near their respective BDC positions. Exhaust ports 48a and 48b are also open when intake piston 36a and exhaust piston 36b are near BDC. Supercharger compressor 162 and turbocharger compressor 135 provide pressurized air to intake manifold 44 which may flow into cylinder 30 when intake ports 44a and 44b are open. As intake piston 36a and exhaust piston 36b move toward their respective TDC positions, exhaust ports 48a and 48b close. As the engine continues to rotate, intake ports 44a and 44b are closed a predetermined actual total number of crankshaft degrees later to prevent additional air from entering cylinder 36. Thus, the exhaust ports are opened before the intake ports and the exhaust ports remain open for nearly the same amount of time the intake ports are open. Fuel is injected to cylinder 30 after exhaust ports 44a and 44b close, then the fuel and air mixture is ignited when intake piston 36a and exhaust piston 36b are near their respective TDC locations. The fuel and air mixture is ignited by compression ignition and not via a spark plug or energy from a glow plug. Fuel may be injected to cylinder 30 via a plurality of injections including pilot injections, main injections, and post injections.

During the second stroke, generally, the intake piston 36a and exhaust piston 36b are moving apart from each other after combustion takes place in cylinder 30. The second stroke begins at TDC of intake piston 36a and it ends at BDC of intake piston 36a. Intake piston 36a and exhaust piston 36b approach their respective BDC positions near where volume of cylinder 30 is greatest. Gases expanding in cylinder 30 push intake piston 36a and exhaust piston 36b apart toward their respective BDC positions. Exhaust piston 36b passes exhaust ports 48a and 48b as it travels toward its BDC. Exhaust ports 48a and 48b are uncovered when top of exhaust piston 36d passes exhaust ports 48a and 48b while exhaust piston 36b is traveling toward crankshaft 40b. Exhaust gases exit cylinder 30 after exhaust piston 36b passes exhaust ports 48a and 48b while traveling toward bottom dead center. Intake pistons 36a and exhaust piston 36b travel further toward their respective bottom dead center positions, and after a predetermined actual total number of crankshaft degrees, intake piston 36a uncovers intake ports 44a and 44b. Intake ports 44a and 44b are uncovered when top of intake piston 36c passes intake ports 44a and 44b while intake piston 36a is traveling toward crankshaft 40a. Fresh air enters cylinder 30 via intake ports 44a and 44b when intake ports 44a and 44b are uncovered. Intake piston 36a and exhaust piston 36b continue to travel toward their respective BDC locations. After intake piston reaches BDC the cylinder cycle repeats.

In this way, the engine cycle is comprised of two strokes and the engine cycle is one engine revolution. Other engine cylinders operate in a similar way but these other cylinders may combust air and fuel out of phase with the cylinder shown. For example, top dead center compression stroke of one engine cylinder may be at zero crankshaft degrees while top dead center of another cylinder may be at one hundred and eighty crankshaft degrees.

Thus, the system of FIG. 1 provides for an engine system, comprising: an opposed piston diesel engine including a cylinder with a first fuel injector and a second fuel injector; a supercharger coupled to the opposed piston diesel engine, the supercharger having multiple drive ratios; a turbocharger coupled to the opposed piston diesel engine; an oxidation catalyst included in an exhaust system of the opposed piston diesel engine; and a controller including executable instructions stored in non-transitory memory to provide an estimate of fuel retained in a cylinder of the opposed piston diesel engine from a first cycle of the cylinder to a second cycle of the cylinder in response to a temperature of the oxidation catalyst. The engine system further comprises additional instructions to adjust a pilot fuel injection amount in response to the estimate of fuel retained in the cylinder.

In some examples, the engine system further comprises additional instructions to adjust a main fuel injection amount in response to the estimate of fuel retained in the cylinder. The engine system further comprises additional instructions to adjust timing of a main fuel injection in response to the estimate of fuel retained in the cylinder. The engine system further comprises additional instructions to adjust an amount of post injected fuel that is injected during the second cycle of the cylinder in response to the estimate of fuel retained in the cylinder. The engine system further comprises additional instructions to estimate the fuel retained in the cylinder in response to a pressure difference between engine intake manifold temperature and engine exhaust manifold temperature. The engine system further comprises additional instructions to estimate the fuel retained in the cylinder in response to an amount of external exhaust gas recirculation.

Engine 10 may receive fuel via a variety of injection types. Pilot fuel injections are short duration fuel injections that may be less than 4 mg. Pilot fuel injections start and end before top-dead-center compression stroke in the cylinder cycle in which they are injected. The pilot fuel injections may reduce engine combustion noise, control peak cylinder pressures, and adjust heat release within the cylinder. Main fuel injections are injections of a greatest amount of fuel that is injected during a cylinder cycle. The main fuel injections may range from 3 mg to 100 mg per cylinder cycle. Pilot fuel injections precede the main fuel injections. Early post fuel injections may occur ten crankshaft degrees after top dead center compression stroke and after a main fuel injection.

Early post fuel injections may range from 1 mg to 10 mg. Late post injections are fuel injections that are preformed after combustion of the main fuel injection pulse is complete and before an exhaust port of the cylinder receiving the fuel closes during the cylinder's cycle. Early and late post injections may be useful for regenerating emissions control devices in the engine's exhaust system (e.g., a PF).

Referring now to FIG. 2, an example block diagram of portions of the method of FIG. 4 is show. The block diagram of FIG. 2 provides a graphic of information exchange for the method of FIG. 4.

Driver demand torque (e.g., a torque requested via a human or autonomous driver via an accelerator pedal or a variable in a register) and engine speed are used to reference table 202. Table 202 provides pilot fuel injection amounts for driver demand and engine speed pairs. Pilot fuel injection amounts are interpolated for driver demand values and engine speed values for which there is not a corresponding table entry pilot fuel injection amount. Table 202 outputs the pilot fuel injection fuel amount to junction 214.

Driver demand torque and engine speed are also used to reference table 204. Table 204 provides pilot fuel injection start of injection timing (e.g., the crankshaft degree where pilot fuel injection begins for a cylinder cycle) for driver demand and engine speed pairs. Pilot fuel injection start of injection timing is interpolated for driver demand values and engine speed values for which there is not a corresponding table entry pilot fuel injection start of injection timing. Table 204 outputs the pilot fuel injection start of injection timing to block 218.

Driver demand torque and engine speed are also used to reference table 206. Table 206 provides main fuel injection amounts for driver demand and engine speed pairs. Main fuel injection amounts are interpolated for driver demand values and engine speed values for which there is not a corresponding table entry main fuel injection amount. Table 206 outputs the main fuel injection fuel amount to junction 216.

Driver demand torque and engine speed are also used to reference table 208. Table 208 provides main fuel injection start of injection timing (e.g., the crankshaft degree where main fuel injection begins for a cylinder cycle) for driver demand and engine speed pairs. Main fuel injection start of injection timing is interpolated for driver demand values and engine speed values for which there is not a corresponding table entry main fuel injection start of injection timing. Table 208 outputs the main fuel injection start of injection timing to block 218.

Desired increase of oxidation catalyst temperature, engine speed, and diesel particulate filter (DPF) regeneration request are used to reference table 210. Table 210 provides post fuel injection amounts for desired increase of oxidation catalyst temperature and engine speed pairs. Post fuel injection amounts are interpolated for desired increase of oxidation catalyst temperatures and engine speed values for which there is not a corresponding table entry post fuel injection amount. Table 210 outputs the post fuel injection fuel amount to block 218.

Desired increase of oxidation catalyst temperature, engine speed, and DPF regeneration request are also used to reference table 212. Table 212 provides post fuel injection end of injection timing (e.g., the crankshaft degree where post fuel injection ends) for desired increase of oxidation catalyst temperature and engine speed pairs. Pilot fuel injection end of injection timing is interpolated for desired increase of oxidation catalyst temperature and engine speed values for which there is not a corresponding table entry pilot fuel injection start of injection timing. Table 212 outputs the pilot fuel injection end of injection timing to block 218.

Values in tables 202-212 are empirically determined via operating an engine on a dynamometer at a plurality of engine speeds and loads. Fuel injection amounts and timings are swept to determine fuel injection amounts and fuel injection timings that provide desired engine torque and emissions values. Post injection amounts are determined via adjusting post fuel injection amounts and timings to provide desired oxidation catalyst temperatures at a plurality of engine speeds.

Residual fuel amounts remaining or retained in a cylinder from a first cylinder cycle to a second cylinder cycle, the second cylinder cycle immediately following the first cylinder cycle, are estimated at block 224. Oxidation catalyst temperature, external exhaust gas amount, pressure differential between intake manifold pressure and exhaust manifold pressure, post injection fuel amount, and post injection end of post injection timing are inputs to block 224. The residual fuel amounts are estimated as described in further detail in the description of FIG. 4. Block 224 outputs the residual fuel for each engine cylinder to blocks 220 and 222.

The residual fuel estimated to at least partially combust during compression is determined at block 220 as will be elaborated on in greater detail in the description of FIG. 4. The residual fuel estimated to at least partially combust during compression is directed to junction 214 where it is subtracted from the pilot fuel injection amount. By subtracting the residual fuel estimated to at least partially combust during compression from the pilot fuel injection fuel amount, the desired pilot fuel injection amount may be achieved so that engine noise and vibration may be provided at desired levels. The adjusted pilot fuel injection amount is directed to block 218 from block 214.

The residual fuel estimated to combust after compression ignition is determined at block 222 as will be elaborated on in greater detail in the description of FIG. 4. The residual fuel estimated to combust after compression ignition is directed to junction 216 where it is subtracted from the main fuel injection amount. By subtracting the residual fuel estimated to combust after compression ignition from the main fuel injection fuel amount, the desired main fuel injection amount may be achieved so that engine torque may be provided at desired levels. The adjusted main fuel injection amount is directed to block 218 from block 216.

At block 218, fuel is injected to one or more cylinders via fuel injectors according to the pilot fuel injection amount, pilot fuel injection start of injection timing, main fuel injection amount, main fuel injection amount start of injection timing, post fuel injection amount, and post fuel injection start of injection timing.

In this way, sensor inputs and calculated values adjust fuel injected to engine cylinders. The injected fuel amounts and timings may be adjusted responsive to residual fuel amounts retained in engine cylinders. Individual estimates of retained fuel amounts may be provided for each engine cylinder and pilot, main, and post injections supplied to each cylinder may be adjusted responsive to the retained fuel amount in the cylinder receiving the fuel.

Referring now to FIG. 3, a DPF regeneration sequence according to method 400 is shown. The DPF regeneration sequence of FIG. 3 may be for the engine and system shown in FIG. 1. The vertical lines at times t0-t4 represent times of interest in the sequence. The plots are aligned in time and occur at the same time. In this example particulate filter regeneration sequence, pilot fuel injection amounts and main fuel injection amounts are adjusted responsive to fuel residuals within an engine cylinder. Fuel residual is post injected fuel that remains in a cylinder for a next cylinder cycle after being injected during a present cylinder cycle. For example, post fuel may be injected as a piston travels toward BDC during a stroke where exhaust valves or ports are opened and a portion of the port injected fuel may remain in the cylinder when the piston completes the stroke and begins to compress charge in the cylinder. The portion of the port injected fuel remaining in the cylinder is the remaining or residual fuel amount.

The first plot from the top of FIG. 3 is a plot of a diesel particulate filter (DPF) regeneration request versus time. Trace 301 represents diesel particulate filter regeneration request state. The vertical axis represents diesel particulate filter regeneration request state and the diesel particulate filter regeneration request is asserted when trace 201 is at a high level near the vertical axis arrow. The diesel particulate filter regeneration request is not asserted when trace 201 is at a lower level near the horizontal axis. The horizontal axis represents time and time increases from the left side of the figure to the right side of the figure.

The second plot from the top of FIG. 3 is a plot of post fuel injection amount of fuel injected to a cylinder versus time. Trace 302 represents pilot fuel injection fuel amount. The vertical axis represents pilot fuel injection fuel amount and pilot fuel injection fuel amount increases in the direction of the vertical axis arrow. The horizontal axis represents time and time increases from the left side of the figure to the right side of the figure.

The third plot from the top of FIG. 3 is a plot of main fuel injection amount versus time. Trace 304 represents main fuel injection amount. The vertical axis represents main fuel injection amount and main fuel injection amount increases in the direction of the vertical axis arrow. The horizontal axis represents time and time increases from the left side of the figure to the right side of the figure.

The fourth plot from the top of FIG. 3 is a plot of post fuel injection amount versus time. Trace 305 represents post fuel injection amount. The vertical axis represents post fuel injection amount and the post injection fuel amount increases in the direction of the vertical axis arrow. The horizontal axis represents time and time increases from the left side of the figure to the right side of the figure.

The fifth plot from the top of FIG. 3 is a plot of residual fuel amount in an engine cylinder versus time. Trace 307 represents the residual fuel amount in an engine cylinder. The vertical axis represents the residual fuel amount in an engine cylinder and residual fuel amount in the cylinder increases in the direction of the vertical axis. The horizontal axis represents time and time increases from the left side of the figure to the right side of the figure.

The sixth plot from the top of FIG. 3 is a plot total EGR amount (e.g., internal EGR amount and external EGR amount) versus time. The vertical axis represents EGR amount supplied to a cylinder. Trace 308 represents the amount of EGR supplied to an engine cylinder. The horizontal axis represents time and time increases from the left side of the figure to the right side of the figure.

The seventh plot from the top of FIG. 3 is a plot soot amount stored in the DPF versus time. The vertical axis represents soot amount. Trace 310 represents the amount of soot stored in a DPF in the engine's exhaust system. The horizontal axis represents time and time increases from the left side of the figure to the right side of the figure.

For each of the seven plots, the value where the vertical axis intersects the horizontal axis is zero. The scaling of each of the vertical axes is not necessarily equivalent.

At time t0, the engine receives medium amounts of pilot injected fuel and main injected fuel. The engine combusts the air and fuel at a medium speed and load (not show). The amount of soot stored in the DPF is at a higher level, but DPF regeneration is not requested in response to present vehicle operating conditions. The post fuel injection amount is zero and the residual fuel is nearly zero. The total EGR amount is at a middle level based on engine speed and load (not shown).

At time t1, the DPF regeneration request is asserted in response to the accumulated soot amount and vehicle operating conditions. The post fuel injection amount begins to increase in response to the particulate filter regeneration request being asserted. The post fuel injection amount is increased to increase DPF temperature. The residual fuel amount in the engine cylinder begins to increase and the pilot and main fuel injections are decreased to compensate for the residual fuel amount that is present from one cycle of the cylinder to the next cycle of the cylinder. The total EGR amount remains at its previous level and the amount of soot remains at its previous level.

Between time t1 and time t2, the residual fuel amount continues to increase and the pilot and main fuel injection amounts are decreased in response to the increasing residual fuel amount. The total EGR amount remains constant and the post injection fuel amount levels off to a constant value. The DPF regeneration request remains asserted and the amount of soot remains at a higher level.

At time t2, the total EGR amount is increased to reduce engine NOx to compensate for reduced NOx conversion efficiency of the exhaust system when exhaust gas temperature is elevated to regenerate the DPF. The residual fuel amount increases in response to the EGR amount increasing because fuel ejected from the cylinder is returned to the cylinder with EGR. The pilot and main fuel injections are decreased further in response to the increase in residual fuel amount. The DPF regeneration request remains asserted and the amount of soot remains unchanged as the DPF temperature increases (not shown). The DPF reaches a temperature at which soot stored in the DPF begins to combust shortly before time t3 and the amount of soot begins to decrease. The combusting soot further increases the temperature of the DPF (not shown).

At time t3, the DPF reaches a threshold temperature and the post injection fuel amount is decreased to maintain DPF temperature. The residual fuel amount is reduced as the amount of post injected fuel is decreased. The main and pilot fuel injection amounts are increased in response to the residual amount of fuel retained in the cylinder decreasing. Specifically, as the residual amount of fuel retained in the cylinder from a first cycle of the cylinder to a second cycle of the cylinder decreases, the amount of residual fuel combusting in the second cycle decreases. Therefore, to maintain engine noise, vibration, and torque at desired levels, the main and pilot fuel injection amounts are increased. The DPF regeneration request remains asserted and the total EGR amount remains at its previous level. The amount of soot continues to decrease.

Between time t3 and time t4, the post injection fuel amount continues to decrease and then levels off at a constant value so that DPF temperature may be maintained less than a threshold temperature. The main and pilot fuel injections increase and then level off at respective constant levels. The amount of soot continues to decrease and the EGR amount remains constant. The DPF regeneration request remains asserted.

At time t4, the amount of soot stored in the DPF is less than a threshold, so the DPF regeneration request is withdrawn. The post fuel injection amount is decreased to zero and the pilot and main fuel injections are increased in response to the residual fuel amount decreasing. The total EGR amount is decreased a short time later as the engine exhaust system decreases.

In this way, pilot and main fuel injection amounts may be increased and decreased responsive to decreases and increases in residual fuel amount. The residual fuel amount is a result of post injection fueling, EGR, and other conditions.

Referring now to FIG. 4, a method for operating an engine and regenerating a particulate filter positioned in an exhaust system downstream of the engine is shown. The method of FIG. 4 may be stored as executable instructions in non-transitory memory in systems such as shown in FIG. 1. The method of FIG. 4 may be incorporated into and may cooperate with the systems of FIG. 1. Further, at least portions of the method of FIG. 4 may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 402, method 400 determines vehicle operating conditions. Vehicle operating conditions may include, but are not limited to an amount of soot stored in a particulate filter, internal EGR residual amount, residual fuel amount, particulate filter temperature, engine speed, engine load, driver demand torque. The vehicle operating conditions may be determined or inferred from sensor data received via controller 12 shown in FIG. 1. For example, the internal EGR residual amount may be estimated responsive to engine speed, engine load, intake manifold pressure, and a position of an exhaust valve (e.g., 140). The engine speed, engine load, intake manifold pressure, and exhaust valve position may reference one or more tables and functions that include empirically determined values of internal EGR residual amount. The tables or functions output the cylinder residual amount estimate. Driver demand torque may be determined from accelerator pedal position and vehicle speed referencing a table or function that holds empirically determined values of driver demand torque. The function or table outputs the driver demand torque. Method 400 proceeds to 404.

At 404, method 400 determines fuel injection amounts and timing for pilot and main fuel injections based on the vehicle operating conditions determined at 402. In one example, pilot fuel injection amounts are determined via referencing a table of empirically determined pilot fuel injection amounts. The empirically determined pilot fuel injection amounts may be pilot fuel injection amounts that provide desired levels of engine noise and vibration at particular engine speeds and driver demand torques. The pilot fuel injection amounts are stored in a table or function in non-transitory memory and they may be referenced or indexed via engine speed and driver demand torque. Similarly, pilot fuel injection start of injection timing values may be determined via referencing a table of empirically determined pilot fuel start of injection timing values. The empirically determined pilot fuel injection timing values may be pilot fuel injection start of injection timing values that provide desired levels of engine noise and vibration at particular engine speeds and driver demand torques. The pilot fuel injection start of injection timings may be stored in a table or function in non-transitory memory and they may be referenced or indexed via engine speed and driver demand torque.

Main fuel injection amounts are also determined via referencing a table of empirically determined main fuel injection amounts. The empirically determined main fuel injection amounts may be main fuel injection amounts that provide desired levels of engine torque at particular engine speeds and driver demand torques. The main fuel injection amounts are stored in a table or function in non-transitory memory and they may be referenced or indexed via engine speed and driver demand torque. Likewise, main fuel injection start of injection timing values may be determined via referencing a table of empirically determined main fuel start of injection timing values. The empirically determined main fuel injection timing values may be main fuel injection start of injection timing values that provide desired levels of engine torque at particular engine speeds and driver demand torques. The main fuel injection start of injection timings may be stored in a table or function in non-transitory memory and they may be referenced or indexed via engine speed and driver demand torque. Method 400 proceeds to 406.

At 406, method 400 judges if DPF regeneration is desired. Method 400 may judge that particulate filter regeneration is desired in response to an amount of soot stored in a particulate filter exceeding a threshold amount and engine load greater than a threshold load. If method 400 judges that DPF regeneration is desired, the answer is yes and method 400 proceeds to 408. Otherwise, the answer is no and method 400 proceeds to 440.

At 440, method 400 ceases DPF regeneration via ceasing to inject post injection fuel. Further, method 400 may adjust engine boost pressure and exhaust throttle positions to cease particulate filter regeneration. Method 400 proceeds to 442.

At 442, method 400 injects pilot and main fuel injection amounts at the start of injection timings determined at 404. The pilot fuel injections provide a desired level of engine noise and vibration and the main fuel injections provide the desired driver demand torque. Method 400 proceeds to exit.

At 408, method 400 begins to increase PF temperature. Method 400 may increase boost pressure and at least partially close the exhaust throttle to increase exhaust gas temperatures to begin PF regeneration. Method 400 proceeds to 410.

At 410, method 400 determines post fuel injection amounts via referencing a table of empirically determined post fuel injection amounts. The empirically determined post fuel injection amounts may be post fuel injection amounts that provide desired levels of catalyst temperature increase from catalyst temperature when the engine is operated at the same speed and driver demand torque without post injection fuel. For example, if oxidation catalyst temperature without post injection fuel is 300° C. at an engine speed of 2000 RPM and 200 Newton-meters (N-M), and desired oxidation catalyst temperature is 650° C. for particulate filter regeneration, then the amount of post injection fuel that provides a 350° C. increase in oxidation catalyst temperature is the post fuel injection fuel amount when the engine is operated at 2000 RPM and 200 N-m. The post fuel injection amounts are stored in a table or function in non-transitory memory and they may be referenced or indexed via engine speed and desired oxidation catalyst temperature increase. Likewise, post fuel injection start of injection timing (e.g., crankshaft angles where post fuel injection starts for a cylinder cycle) values may be determined via referencing a table of empirically determined post fuel start of injection timing values. The empirically determined post fuel injection timing values may be post fuel injection end of injection timing values that provide desired levels of oxidation catalyst temperature increase and desired residual amounts of fuel in cylinders in which post injection fuel is injected at particular engine speeds and desired oxidation catalyst temperature increase level. The post fuel injection end of injection timings may be stored in a table or function in non-transitory memory and they may be referenced or indexed via engine speed and desired oxidation catalyst temperature increase. Post fuel injection end of injection timing is a crankshaft angle where post fuel injection stops during a cylinder cycle. Method 400 proceeds to 412.

At 412, method 400 adjusts pilot fuel injection amounts, main fuel injection amounts, and main fuel injection start of injection timing. In particular, the amount of pilot fuel injection is reduced by the estimated amount of residual fuel that combusts during compression in a cylinder cycle. Diesel fuel is a fuel that exhibits two phases of combustion. During a first phase of combustion (e.g., a low temperature heat release phase), larger chain hydrocarbons are broken down into smaller chain hydrocarbons in an exothermic reaction. The first phase of combustion may be characterized by the presence of formation of formaldehydes and an absence of OH radicals and $CO_2$. The second stage of fuel combustion is identified by $CO_2$ formation and OH radical formation. The second stage of fuel combustion may occur after compression ignition. The presence of both the first phase and the second phase of combustion may be indicated by changes in pressure within a cylinder. An amount of residual fuel that participates in first phase combustion may be estimated via an amount of heat released during compression, which may be indicated via a rise in cylinder pressure. And, the residual fuel amount from which the heat release originated from may be estimated as is described in further detail at 420. The amount of residual fuel that participates in first phase combustion may be expressed as a fraction of the residual fuel amount and the fractional value may be stored in a table or function referenced by engine temperature, air charge temperature, cylinder air charge, and engine speed. The fractional amount may be empirically determined and it may be multiplied by the residual fuel amount to determine the amount of residual fuel that combusts during compression. The amount of residual fuel that combusts during compression may then be subtracted from the pilot fuel injection amount determined at 404 to determine an adjusted pilot fuel injection amount. In this way, adjusted pilot fuel injection amounts may be determined for each engine cylinder.

If the amount of residual fuel that participates in first phase combustion or in compression phase combustion before the main fuel pulse starts to be injected is greater than a threshold, main fuel pulse width start of injection time may be delayed a predetermined number of crankshaft degrees to delay peak cylinder pressure, thereby constraining engine torque so that torque closer to desired torque may be produced by the engine.

An amount of residual fuel that participates in second phase combustion may be estimated via an amount of heat released after compression ignition, which may be indicated via a rise in cylinder pressure. And, the residual fuel amount from which the heat release originated from may be estimated as is at 420. The amount of residual fuel that participates in second phase combustion may be expressed as a fraction of the residual fuel amount and the fractional value may be stored in a table or function referenced by engine temperature, air charge temperature, cylinder air charge, and engine speed. The fractional amount may be empirically determined and it may be multiplied by the residual fuel amount to determine the amount of residual fuel that combusts after compression ignition. The amount of residual fuel that combusts after compression ignition may then be subtracted from the main fuel injection amount determined at 404 to determine an adjusted main fuel injection amount. In this way, adjusted main fuel injection amounts may be determined for each engine cylinder. Method 400 proceeds to 414 after determining the adjusted pilot fuel injection amount, the adjusted main fuel injection amount, and adjusted start of main fuel injection timing.

At 414, method 400 injects the adjusted pilot injection fuel amounts and the adjusted main fuel injection amounts engine cylinders. The pilot injection begins at the start of pilot injection timing determined at 404 and the main injection begins at the adjusted start of main injection timing determined at 412. Method 400 proceeds to 416.

At 416, method 400 determines the diesel oxidation catalyst (DOC) or oxidation catalyst temperature. The oxidation catalyst temperature may be determined via a temperature sensor. Method 400 proceeds to 418.

At 418, method 400 estimates internal residual exhaust gases and external exhaust gases in engine cylinders. The internal exhaust gases and external exhaust gases in engine cylinders may be indicative of residual fuel amounts in engine cylinders.

Internal exhaust gas residuals are gas residuals (HC, NOx, and CO) that remain in a cylinder from a first combustion event (e.g., combustion of air and fuel in a cylinder) to a next second combustion event in the cylinder. The internal exhaust residuals do not exit the cylinder from the first combustion event to the next or second combustion event, except internal residuals may include residuals that exit the exhaust port after a first combustion event and that are drawn back into the cylinder from the exhaust port before the second combustion event. Internal exhaust gas residuals do not include exhaust gas residuals that exit the exhaust port and reenter the cylinder via the intake port. In one example, method 400 estimates the internal exhaust gas residual (IEGR) amount in the cylinder. In one example, the internal residual amount may be estimated by referencing one or more tables or functions via engine speed, engine load, boost pressure (e.g., engine intake manifold pressure), and exhaust throttle position or exhaust manifold pressure. The tables or functions hold empirically determined internal residual exhaust gas amount estimates. The tables or functions output the internal exhaust gas residual amount.

The external exhaust gas residual amount may be determined via estimating exhaust flow through EGR passage 82 via pressure sensor 89. The mass of exhaust gas flowing through exhaust passage 82 is divided amongst the total number of engine cylinders to determine the mass of external EGR in each cylinder during a cylinder cycle. Method 400 proceeds to 420.

At 420, method 400 determines a residual fuel amount of fuel in an engine cylinder. Estimates for each engine cylinder may be provided in similar ways. In one example, the residual fuel amount is estimated from an oxidation catalyst temperature increase. In particular, the oxidation catalyst temperature increase is oxidation catalyst temperature after beginning to post inject fuel minus oxidation catalyst temperature before beginning to post inject fuel. The oxidation catalyst temperature increase provides an indication of the amount of post injected fuel oxidized on the catalyst and that is not in the engine cylinders. The oxidation temperature increase attributed to an individual cylinder may be determined by dividing the oxidation catalyst temperature increase by the number of active cylinders (e.g., cylinders combusting air and fuel). The oxidation catalyst temperature increase may be expressed as a function of post injected fuel combusted within the oxidation catalyst (e.g., a 1° C. increase in oxidation catalyst temperature=X ppm of HC) and a fraction of the combusted HC may be allocated to each engine cylinder. Thus, the oxidation catalyst temperature increase may be converted into estimates of post injected fuel amounts that exit engine cylinders. The amount of fuel retained in engine cylinders from a first cylinder cycle to a second cylinder cycle, the second cylinder cycle immediately following the first cylinder cycle, may then be determined via subtracting the amount of fuel oxidized in the catalyst that caused to catalyst temperature increase from the post fuel injection amount in the cylinder. The remaining amount of fuel is the estimated amount of fuel retained in engine cylinder.

In another example, the residual fuel amount is estimated from post injection end of injection time, post fuel injection quantity, pressure difference between engine intake manifold pressure and engine exhaust manifold pressure to determine internal EGR amounts, and external EGR in engine cylinders. Specifically, the pressure difference between the engine intake manifold and the engine exhaust manifold may be converted into an IEGR amount as described at 418 and the external EGR amount may be added to the IEGR amount to determine a total EGR amount in a cylinder. The total EGR amount in a cylinder for a present cylinder cycle is a fraction of the total exhaust gas in the cylinder at the end of an immediate past cylinder cycle. Further, it may be estimated that the total EGR amount in an engine cylinder includes the same fraction of post injected fuel as the fraction of EGR retained in a cylinder in a present cylinder cycle. For example, if a cylinder contains X milligrams grams of exhaust gas in a cylinder after combustion in the cylinder during an immediate past cylinder cycle and the cylinder includes 5% of the X milligrams of exhaust gas (e.g., the total EGR amount) in the present cylinder cycle, it may be estimated that the cylinder also includes 5% or an adjusted fraction of the fuel post amount injected during the immediate past cylinder cycle. Therefore, if Y milligrams of fuel are post injected during the immediate past cylinder cycle, it may be estimated that 5% of Y milligrams of post injected fuel is included as residual fuel in the present cylinder cycle. The estimated post injected fuel retained in the cylinder as determined from EGR may be further adjusted as a function of end of post fuel injection timing to provide the estimate of fuel residual. For example, values in a table or function empirically determined via adjusting end of post injection fuel timings may be referenced by end of post injection timing and the values may multiply the amount of post injected fuel retained in the cylinder to provide an adjusted post injection amount of fuel retained in the cylinder from one cylinder cycle to the next cylinder cycle. Further, if the amount of fuel retained in an engine cylinder is estimated from the amount of post fuel injected, the increase in catalyst temperature may be estimated from the post injected fuel combusted in the catalyst (e.g., difference between the post injected fuel amount and the amount of fuel retained in the cylinder) and the function expressing the relationship between the amount of post injected fuel combusted within the oxidation catalyst (e.g., a 1° C. increase in oxidation catalyst temperature=X ppm of HC) and catalyst temperature increase.

In these ways, the amount of fuel residual or fuel retained in one or more engine cylinders may be determined. The amount of post injected fuel that is retained in the cylinder from the present cylinder cycle to the next cylinder cycle is stored into controller memory so that it may be retrieved and used at 412 for the next cylinder cycle when method 400 is executed again. Method 400 proceeds to 422.

At 422, method 400 judges if DPF regeneration is complete. In one example, method 400 may judge that DPF regeneration is complete if an amount of soot in the DPF if less than a threshold. Method 400 may determine that an amount of soot stored in the DPF is less than a threshold based on a pressure drop across the DPF. If method 400 judges that DPF regeneration is complete, the answer is yes and method 400 proceeds to exit. Otherwise, method 400 returns to 410.

Thus, the method of FIG. 4 provides for an engine control method, comprising: estimating an amount of fuel held in a cylinder from a first cycle of the cylinder to a second cycle of the cylinder via a controller in response to a temperature increase of an oxidation catalyst; and adjusting an amount of fuel injected to the cylinder via the controller during the second cycle of the cylinder in response to the estimated amount of fuel. The engine control method further comprises estimating the amount of fuel held in the cylinder in further response to injection timing of post fuel injections during the first cycle of the cylinder. The engine control method further comprises estimating the amount of fuel held in the cylinder in further response to internal and external exhaust gas residual amounts in the cylinder. The engine control method further comprises estimating the amount of fuel held in the cylinder in further response to a pressure difference between intake manifold pressure and exhaust manifold pressure. The engine control method includes where adjusting the amount of fuel injected during the second cycle of the cylinder includes adjusting an amount of fuel in pilot fuel injections. The engine control method includes where adjusting the amount of fuel injected during the second cycle of the cylinder includes adjusting an amount of fuel in main fuel injections. The engine control method includes where the second cycle immediately follows the first cycle of the cylinder. The engine control method further comprises adjusting start of injection timing of a main fuel injection during the second cycle in response to the estimated amount of fuel.

The method of FIG. 4 also provides for an engine control method, comprising: estimating an amount of fuel held in a cylinder from a first cycle of the cylinder to a second cycle of the cylinder via a controller in response to timing of post injected fuel injected during the first cycle of the cylinder, amount of fuel post injected during the first cycle of the cylinder, exhaust residual amount in the cylinder during the second cycle of the cylinder, and a pressure difference between intake manifold pressure and exhaust manifold temperature a temperature increase of an oxidation catalyst; and adjusting an amount of fuel injected to the cylinder during the second cycle of the cylinder via the controller in response to the estimated amount of fuel. The engine control method includes where injecting the post injection fuel amount includes injecting fuel via the second fuel injector between 20 and 30 crankshaft degrees before the exhaust port opens during a cycle of the cylinder. The engine control method includes where adjusting the amount of fuel injected during the second cycle of the cylinder includes adjusting an amount of fuel in pilot fuel injections. The engine control method includes where adjusting the amount of fuel injected during the second cycle of the cylinder includes adjusting an amount of fuel in main fuel injections. The engine control method includes where the second cycle immediately follows the first cycle of the cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine control method, comprising:
    estimating an amount of fuel held in a cylinder from a first cycle of the cylinder to a second cycle of the cylinder via a controller in response to a temperature increase of an oxidation catalyst; and
    adjusting an amount of fuel injected to the cylinder via the controller during the second cycle of the cylinder in response to the estimated amount of fuel.

2. The engine control method of claim 1, further comprising estimating the amount of fuel held in the cylinder in further response to injection timing of post fuel injections during the first cycle of the cylinder.

3. The engine control method of claim 1, further comprising estimating the amount of fuel held in the cylinder in further response to internal and external exhaust gas residual amounts in the cylinder.

4. The engine control method of claim 1, further comprising estimating the amount of fuel held in the cylinder in further response to a pressure difference between intake manifold pressure and exhaust manifold pressure.

5. The engine control method of claim 1, where adjusting the amount of fuel injected during the second cycle of the cylinder includes adjusting an amount of fuel in pilot fuel injections.

6. The engine control method of claim 1, where adjusting the amount of fuel injected during the second cycle of the cylinder includes adjusting an amount of fuel in main fuel injections.

7. The engine control method of claim 1, where the second cycle of the cylinder immediately follows the first cycle of the cylinder.

8. The engine control method of claim 1, further comprising adjusting a start of injection timing of a main fuel injection during the second cycle of the cylinder in response to the estimated amount of fuel.

9. An engine control method, comprising:
    estimating an amount of fuel held in a cylinder from a first cycle of the cylinder to a second cycle of the cylinder via a controller in response to timing of post injected fuel injected during the first cycle of the cylinder, an amount of fuel post injected during the first cycle of the cylinder, an exhaust residual amount in the cylinder during the second cycle of the cylinder, a pressure difference between intake manifold pressure and exhaust manifold pressure, and a temperature increase of an oxidation catalyst; and
    adjusting an amount of fuel injected to the cylinder during the second cycle of the cylinder via the controller in response to the estimated amount of fuel held in the cylinder.

10. The engine control method of claim 9, where injecting the post injection fuel amount includes injecting fuel via a second fuel injector between 20 and 30 crankshaft degrees before an exhaust port opens during a cycle of the cylinder.

11. The engine control method of claim 9, where adjusting the amount of fuel injected during the second cycle of the cylinder includes adjusting an amount of fuel in pilot fuel injections.

12. The engine control method of claim 9, where adjusting the amount of fuel injected during the second cycle of the cylinder includes adjusting an amount of fuel in main fuel injections.

13. The engine control method of claim 9, where the second cycle of the cylinder immediately follows the first cycle of the cylinder.

14. An engine system, comprising:
    an opposed piston diesel engine including a cylinder with a first fuel injector and a second fuel injector;
    a supercharger coupled to the opposed piston diesel engine, the supercharger having multiple drive ratios;
    a turbocharger coupled to the opposed piston diesel engine;
    an oxidation catalyst included in an exhaust system of the opposed piston diesel engine; and a controller including executable instructions stored in non-transitory memory to provide an estimate of fuel retained in a cylinder of the opposed piston diesel engine from a first cycle of the cylinder to a second cycle of the cylinder in response to a temperature of the oxidation catalyst.

15. The engine system of claim 14, further comprising additional instructions to adjust a pilot fuel injection amount in response to the estimate of fuel retained in the cylinder.

16. The engine system of claim 14, further comprising additional instructions to adjust a main fuel injection amount in response to the estimate of fuel retained in the cylinder.

17. The engine system of claim 14, further comprising additional instructions to adjust a timing of a main fuel injection in response to the estimate of fuel retained in the cylinder.

18. The engine system of claim 14, further comprising additional instructions to adjust an amount of post injected fuel that is injected during the second cycle of the cylinder in response to the estimate of fuel retained in the cylinder.

19. The engine system of claim 14, further comprising additional instructions to estimate the fuel retained in the cylinder in response to a pressure difference between engine intake manifold pressure and engine exhaust manifold pressure.

20. The engine system of claim 14, further comprising additional instructions to estimate the fuel retained in the cylinder in response to an amount of external exhaust gas recirculation.

* * * * *